Figure 5:
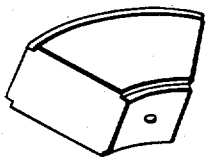
Figure 1:
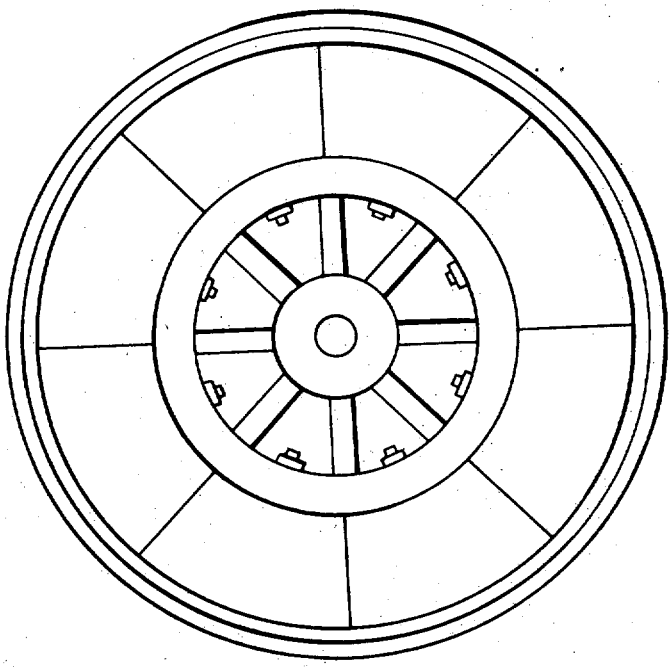
Figure 4:
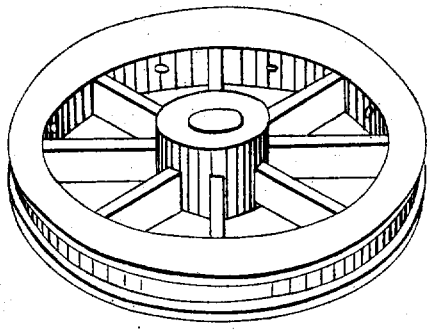
Figure 3:
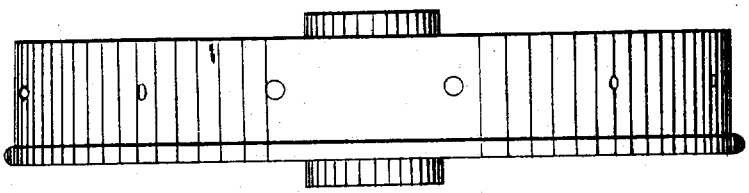
Figure 2:
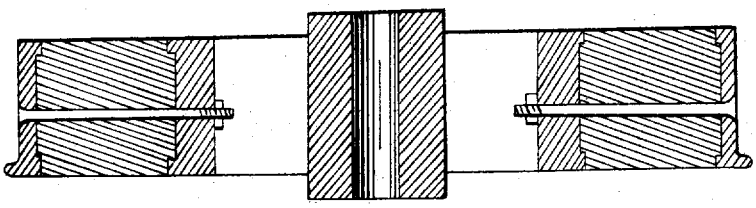

2 Sheets—Sheet 1.

R. WINANS.

7847X

Car Wheel.

Patented Nov. 19, 1833.

THE MORRIS PETERS CO., PHOTO-LITHO., WASHINGTON, D. C.

2 Sheets—Sheet 2.

R. WINANS.

7847X

Car Wheel.

Patented Nov. 19, 1833.

AM. PHOTO-LITHO. CO. N.Y. (OSBORNE'S PROCESS.)

784[illegible]X Nov. 19, 1833 [illegible] 15 49

Ross Winans
Letters Patent

The schedule referred to in these Letters Patent and making part of the same containing a description in the words of the said Ross Winans him self of his improvement in the mode of constructing wheels for cars and Locomotive engines to be used on Rail ways

---

To all whom it may concern. Be it known that I Ross Winans of the City of Baltimore in the state of Maryland civil Engineer have invented an improvement of constructing wheels for cars and locomotive engines to be used upon Rail Roads and that the following is a full and exact description thereof.
The more clearly to exhibit the difference between my improved wheel and those which have been heretofore employed I will briefly point out the manner in which wheels for this purpose have been most commonly made, not intending however as it is not necessary for the purpose in view to advert all the plans which have been adopted.
1st Such wheels have been made wholly or mainly of cast iron, the face or tread of them being cast within a chill consisting of a thick rim or hoop of iron which forms a part of the mould. 2nd The wheels have been cast without being chilled and afterwards hooped with wrought iron which then forms the face and flanch of the wheel.
3. A cast iron nave or hub has been made to receive wooden spokes inserted in wooden fellys which were hooped with a tire of wrought iron. 4th The hubs have been of cast iron with spokes of wrought iron and a rim of wrought or of cast iron hooped with wrought iron. These plans have each their respective advantages and disadvantages but neither of them has fully answered the purpose for which it has been adopted, the wrought iron hoops or tires upon the cast iron rims have gradually become loosened, the wooden spokes and fellys have [illegible] the one into the other and the [illegible] ceased to bind them, and [illegible] which wedging [illegible]. To remedy these defects and others incident to some of these wheels is the object of my improvement. My wheel consists essentially of three parts namely an interior wheel the hub, spokes, and rim of which are of cast iron a [illegible] of wood formed in a way to be presently described surrounding the cast iron wheel. a hoop or tire of wrought iron surrounding the wood and forming the face or tread

78477X of the wheel. The inner wheel is made in some respects like that first noticed
but the face is not chilled nor has it the same form with the chilled face. It
should be made of the same width on the rim with the wrought tire which is
to surround and form the tread of the wheel say five inches. The face of the cast
iron may be cylindrical for the greater part of its width but it must in this
case have a fillet or edge projecting up on each side of it say to the height
and of the thickness of half an inch which will then give to it the appearance
of a wheel with a double flanch having a cylindrical tread of four inches
in width. Instead of making the face in this form I intend sometimes to give to
it a regular declination from each edge towards the centre. A section of the rim
transversely would then be somewhat in the form of the letter V. but with the angle
obtuse. The inclination will be sufficient if the diameter at the centre of the
rim is one inch less than that of the sides or edges. Other forms may be given to the
face of this rim by which the object in view may be attained namely that of
retaining the wooden rim in its place without allowing it to move out on
either side. A rim of wood is to be placed around this which may consist of
any convenient number of pieces fitted to each other and to the face of the wheel.
The grain of the wood is to cross the rim of the wheel running parallel with its
axis These pieces may be fitted to the face of the wheel with great facility by
driving them into a large hoop running as a chuck in a lathe by which
means they may be turned to the form required, they may then be fastened on
to the rim by wood screws or otherwise and turned thereon to receive the iron
hoop or tire. The best thickness of this rim will be from two to four inches,
The hoop or tire of wrought iron is to be made in the usual form turned truly
and passed on over the wooden rim when expanded by heating it as highly as
may be done without burning the wood. Bolts are then to be passed through the
wrought iron, the wood and the cast iron rims and secured by nuts to confine
the whole together. The hub or nave in a wheel thus made may be cast entire
instead of having those divisions or openings which are necessary in the chilled
wheel to allow for contraction. Although I have described the spokes and rim
as being of cast iron, either or both of these may be of wrought iron but it would
be more costly without affording any adequate advantages, those of cast iron
being perfectly safe in this mode of construction. It will be [illegible]

78477X ceived that the wood thus pressed between two hoops of iron has an extent of bearing surface which will effectually prevent its being condensed by the force to which it is subjected, whilst by its elasticity it will tend to preserve both the road and the vehicles passing over it. If perfectly dried when put on which may be done by artificial heat the wood will never shrink but on the contrary will expand and render all the part more firm. Such a wheel will have less tendency than any other where wood is employed to get out of truth and should wedging become necessary it may be done more effectually than with any other. The dimensions of most of the parts of such a wheel need not differ greatly from those of the cast iron wheels with chilled rims, but like them must vary according to their diameter and the load they are to sustain, the following is a good proportion for wheels of three feet in diameter intended for cars carrying three tons. Cast iron interior wheel 29 inches diameter, hub 7 inches long by 5 in diameter spokes 12 in number 7/8 of an inch thick and 3½ or 4 inches broad, rim 5 inches broad, by 7/8 of an inch thick; wooden rim 2 7/8 inches thick, 5 inches deep measuring across the rim, wrought iron tire 7/8 inch thick 5 inches broad flanch 1¼ inch deep, 1 inch thick.

Although I have described the rim of wood as placed with its [illegible] crossing the rim of the wheel and am fully convinced that this is the best manner of placing it, yet it will answer the purpose to a considerable extent when running in the direction of the rim, and I do not intend therefore to limit myself in this respect as What I claim as my invention is the interposing a rim or belt of wood between an interior wheel of cast or of wrought iron and a wrought iron rim or tire, and securing the whole together in the manner and for the purposes herein before set forth.

Witnesses
John Elgar
Thos. W. Griffith

Ross Winans

Ex.d
C.H.W.

1835 n.d.